(12) United States Patent
Aoki

(10) Patent No.: US 11,054,286 B2
(45) Date of Patent: Jul. 6, 2021

(54) SCALE AND MANUFACTURING METHOD OF THE SAME

(71) Applicant: MITUTOYO CORPORATION, Kanagawa (JP)

(72) Inventor: Toshihiko Aoki, Kanagawa (JP)

(73) Assignee: MITUTOYO CORPORATION, Kawasaki (JP)

( * ) Notice: Subject to any disclaimer, the term of this patent is extended or adjusted under 35 U.S.C. 154(b) by 292 days.

(21) Appl. No.: 16/227,573

(22) Filed: Dec. 20, 2018

(65) Prior Publication Data

US 2019/0204118 A1    Jul. 4, 2019

(30) Foreign Application Priority Data

Dec. 28, 2017    (JP) .............................. JP2017-252956

(51) Int. Cl.
*G01D 5/347*    (2006.01)

(52) U.S. Cl.
CPC ................................ *G01D 5/34707* (2013.01)

(58) Field of Classification Search
CPC ..... G01D 5/34707; G01D 5/26; G02B 5/1861
USPC .......................................................... 33/707
See application file for complete search history.

(56) References Cited

U.S. PATENT DOCUMENTS

| | | | | | |
|---|---|---|---|---|---|
| 5,327,218 | A * | 7/1994 | Igaki | ........................ | G01D 5/38 250/231.14 |
| 6,603,114 | B1 * | 8/2003 | Holzapfel | .......... | G01D 5/34715 250/231.14 |
| 6,671,092 | B2 * | 12/2003 | Flatscher | ........... | G01D 5/34707 250/237 G |
| 7,268,946 | B2 * | 9/2007 | Wang | ................... | G02B 5/1809 359/484.1 |
| 7,395,698 | B2 * | 7/2008 | Degertekin | ............ | G01Q 20/04 73/105 |
| 2004/0218270 | A1 * | 11/2004 | Wang | ................... | G02B 5/1809 359/486.01 |
| 2005/0207013 | A1 | 9/2005 | Kanno et al. | | |
| 2006/0140538 | A1 | 6/2006 | Isano et al. | | |
| 2006/0277778 | A1 * | 12/2006 | Mick | ....................... | H01J 37/20 33/562 |
| 2010/0193671 | A1 | 8/2010 | Oshida et al. | | |
| 2012/0097843 | A1 * | 4/2012 | Mori | ................... | G01D 5/34723 250/227.28 |
| 2017/0211923 | A1 * | 7/2017 | Speckbacher | ............ | G01D 5/38 |
| 2018/0321062 | A1 * | 11/2018 | Evans | ................ | G01D 5/34715 |
| 2019/0204118 | A1 * | 7/2019 | Aoki | ................... | G01D 5/34707 |
| 2019/0204119 | A1 * | 7/2019 | Aoki | ................... | G01D 5/34707 |

FOREIGN PATENT DOCUMENTS

| | | |
|---|---|---|
| JP | 2004-354316 | 12/2004 |
| JP | 2005-308718 | 11/2005 |
| JP | 2006-178312 | 7/2006 |

(Continued)

*Primary Examiner* — Yaritza Guadalupe-McCall
(74) *Attorney, Agent, or Firm* — Rankin, Hill & Clark LLP

(57) ABSTRACT

A scale includes: a substrate; scale gratings that are formed on a face of the substrate and has a plurality of metal gratings at a predetermined interval; and an inorganic transparent member that is provided between the plurality of metal gratings, wherein at least a surface of the face of the substrate is made of a metal, and wherein the scale gratings and the inorganic transparent member are exposed to atmosphere.

13 Claims, 8 Drawing Sheets

(56) References Cited

FOREIGN PATENT DOCUMENTS

| JP | 2008-045931 | 2/2008 |
| JP | 2008-256655 | 10/2008 |
| JP | 2011-247600 | 12/2011 |
| JP | 5240198 | 4/2013 |

* cited by examiner

SCALE AND MANUFACTURING METHOD OF THE SAME

CROSS-REFERENCE TO RELATED APPLICATION

This application is based upon and claims the benefit of priority of the prior Japanese Patent Application No. 2017-252956, filed on Dec. 28, 2017, the entire contents of which are incorporated herein by reference.

FIELD

A certain aspect of embodiments described herein relates to a scale and a manufacturing method of a scale.

BACKGROUND

A scale having scale gratings for reflecting an incident light is disclosed as a photoelectric linear scale of a reflection type (for example, see Japanese Patent Application Publication No. 2005-308718). The scale has a phase grating structure using a level difference between an upper face and a lower face of gratings. The scale gratings have a convexo-concave shape having a predetermined level difference with respect to a base. Therefore, when a contaminant adhering to the scale is removed by wiping or the like, the scale gratings may be damaged. The contaminant may be left in a recess between scale gratings during wiping. In this case, measurement accuracy may be degraded. When the scale gratings have a micro size, the measurement accuracy may be remarkably degraded. And so, there is disclosed a technology in which a protective layer covers the convexoconcave shape of gratings (for example, see Japanese Patent Application Publication No. 2006-178312).

SUMMARY

When a protective layer is provided, a process such as a CMP (Chemical Mechanical Polishing) process is needed in order to flatten the protective layer. In this case, a manufacturing process may be complicated. Alternatively, it is possible to flatten the protective layer by using an organic material layer as the protective layer (for example, see Japanese Patent Application Publication No. 2008-256655). However, when the organic material is used, influence of coloring peculiar to the organic material caused by chronological degradation is large. In this case, measurement accuracy may be degraded.

The present invention has a purpose of providing a scale that can be simply manufactured and has high measurement accuracy and a manufacturing method of the scale.

According to an aspect of the present invention, there is provided a scale including: a substrate; scale gratings that are formed on a face of the substrate and has a plurality of metal gratings at a predetermined interval; and an inorganic transparent member that is provided between the plurality of metal gratings, wherein at least a surface of the face of the substrate is made of a metal, and wherein the scale gratings and the inorganic transparent member are exposed to atmosphere.

According to another aspect of the present invention, there is provided a manufacturing method of a scale including: forming a plurality of gratings on a face of a substrate at a predetermined interval; and forming a metal grating between the plurality of gratings by supplying liquid including a metal acting as filling liquid into between the plurality of gratings, wherein at least a surface of the face of the substrate is made of a metal.

According to another aspect of the present invention, there is provided a manufacturing method of a scale including: preparing a substrate in which a surface of at least a face is covered by a metal and a plurality of metal gratings are formed on the face at a predetermined interval; and forming an inorganic transparent member between the plurality of gratings by supplying liquid inorganic transparent material acting as filling liquid into the plurality of gratings.

DESCRIPTION OF EMBODIMENTS

The following is a description of embodiments, with reference to the accompanying drawings.

First Embodiment

Figure 1A:
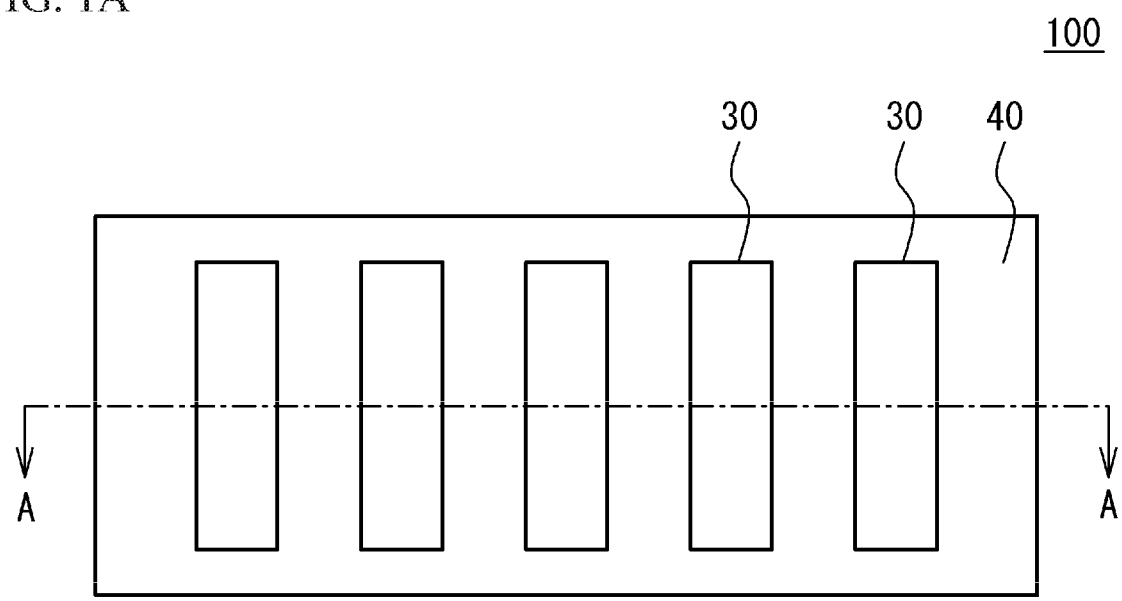
FIG. 1A illustrates a plan view of a scale in accordance with a first embodiment.
Figure 1B:
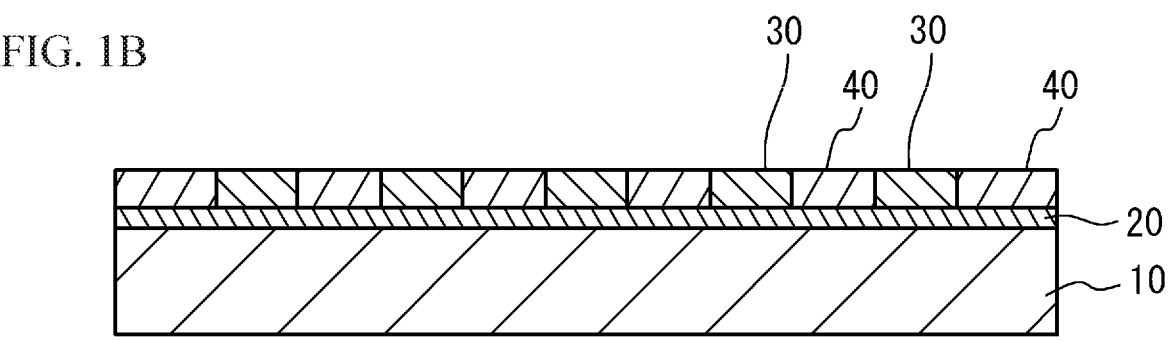
FIG. 1B illustrates a cross sectional view taken along a line A-A of FIG. 1A.

FIG. 1A illustrates a plan view of a scale 100 in accordance with a first embodiment. FIG. 1B illustrates a cross sectional view taken along a line A-A of FIG. 1A. As illustrated in FIG. 1A and FIG. 1B, the scale 100 has a structure in which a metal reflection layer 20 is provided on a surface of a face (upper face) of a substrate 10, and metal scale gratings 30 having a plurality of metal gratings at a predetermined interval on the metal reflection layer 20. An inorganic transparent member 40 is provided in a recess formed by two metal gratings of the scale gratings 30 next to each other. That is, the inorganic transparent member 40 covers an exposed portion of the upper face of the metal reflection layer 20.

The substrate 10 is not limited. The substrate 10 is, for example, made of glass or the like. A low expansion coefficient material such as quartz glass (synthetic molten silica) may be used as the glass.

The metal reflection layer 20 has to be a metal material. For example, it is preferable that the metal reflection layer 20 has high adhesiveness with the substrate 10. For example, when the substrate 10 is made of glass, it is preferable that Cr (chromium), Al (aluminum), Ag (silver), $TiSi_2$ (titanium silicide), Ni (nickel) or the like is used.

The scale gratings 30 have only to be a metal material. For example, the scale gratings 30 are plated members. For example, it is preferable that the scale gratings 30 are made of Cr, Ni, Cu (copper) so that plating of the metal reflection layer 20 gets easier. The inorganic transparent member 40 has only to be an inorganic transparent material achieving transparency. For example, the inorganic transparent member 40 may be $SiO_2$ (silicon dioxide), $MgF_2$ (magnesium fluoride) or the like. An upper face of the scale gratings 30 and an upper face of the inorganic transparent member 40 are exposed to atmosphere. That is, another layer such as a protective layer is not formed on the upper face of the scale gratings 30 or the upper face of the inorganic transparent member 40.

In the embodiment, phase gratings are formed by the level difference between the metal reflection layer 20 and the scale gratings 30. It is therefore possible to use the scale 100 as a reflection type scale.

Next, it is possible to reduce the level difference formed by the scale gratings 30 because the inorganic transparent member 40 is provided in a recess between the metal gratings. It is therefore possible to suppress hanging of a wiping member caused by the level difference or damaging of the scale gratings 30 caused by lacking of rigidity of the scale gratings or the like, during removing the contaminant adhering to the scale gratings 30 by wiping or the like. And it is possible to suppress remaining of the contaminant in the recess between metal gratings of the scale gratings 30, during removing the contaminant on the upper face of the scale gratings 30 by wiping. It is therefore possible to achieve high measurement accuracy.

Next, a process such as chemical mechanical polishing is not needed, because another layer such as a protective layer is not formed. It is therefore possible to simply manufacture the scale 100. In particular, when the scale gratings 30 are formed on the metal reflection layer 20 by plating or the like, a vacuum technology such as a vapor deposition device or a sputtering device may not be necessarily used. In this case, it is possible to simply manufacture the scale 100.

It is preferable that the level difference between the upper face of the scale gratings 30 and the upper face of the inorganic transparent member 40 is equal or less than ¼ of the height (grating height) from the metal reflection layer 20 to each metal grating of the scale gratings 30. In this case, it is possible to suppress the damage of the scale gratings 30 during wiping and remaining of the contaminant, because the level difference is small. Thus, it is possible to achieve high measurement accuracy. In particular, it is preferable that there is no level difference between the upper face of the scale gratings 30 and the upper face of the inorganic transparent member 40.

The height from the metal reflection layer 20 to each metal grating of the scale gratings 30 is determined on the basis of parameters such as a wavelength of an incident light to the scale 100, an incident angle of the incident light, a diffraction index of the inorganic transparent member 40.

Figure 2A:
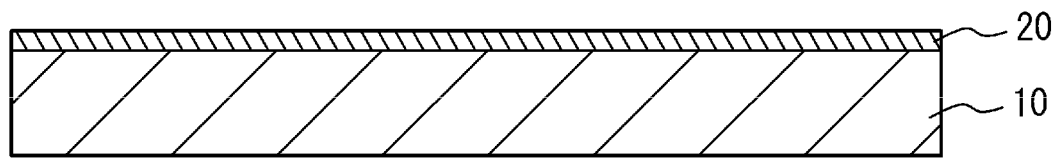
FIG. 2A to FIG. 2D illustrate a manufacturing method of a scale.

FIG. 2A to FIG. 2D illustrate a manufacturing method of the scale 100. As illustrated in FIG. 2A, the metal reflection layer 20 is formed on a face (upper face) of the substrate 10. It is possible to form the metal reflection layer 20 by a chemical vapor deposition method, a physical vapor deposition method or the like.

Figure 2B:
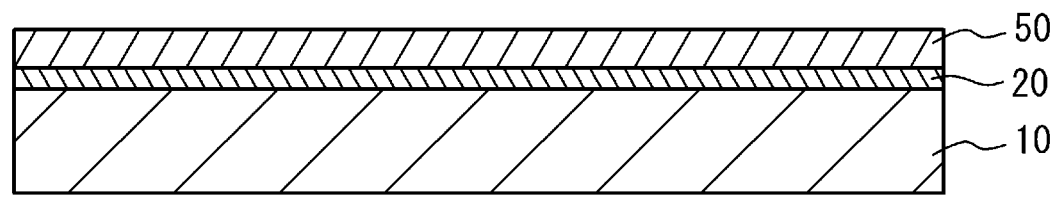

Next, as illustrated in FIG. 2B, a layer 50 to be etched is formed on the metal reflection layer 20. The layer 50 to be etched is a layer for forming the inorganic transparent member 40. Therefore, a material of the layer 50 to be etched is the same as that of the inorganic transparent member 40. It is possible to form the layer 50 to be etched by a vacuum deposition such as a vapor deposition method or a sputtering method, or a wet method such as a sol-gel method or a coating-sintering method.

Figure 2C:
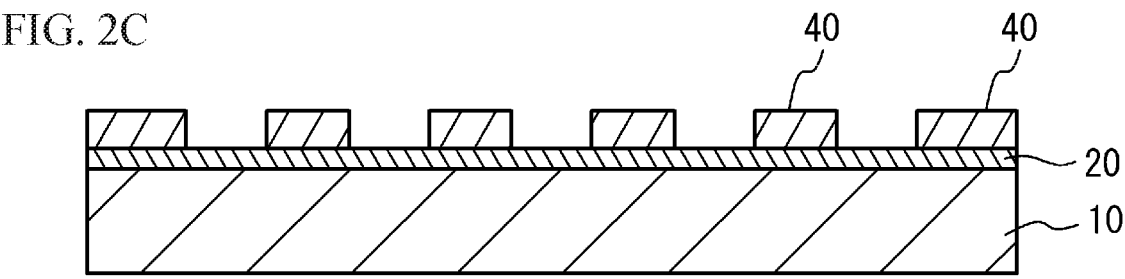

Next, as illustrated in FIG. 2C, resist patterns having reverse patterns with respect to the scale gratings 30 are used as masks, and the layer 50 to be etched is etched. When the layer 50 to be etched is made of a photosensitive material, it is possible to omit an etching process after coating of the resist because only coating, exposure, developing and sintering are performed. Thus, the inorganic transparent member 40 is formed. The patterns of the inorganic transparent member 40 are opposite to the patterns of the scale gratings 30. Therefore, the inorganic transparent member 40 has a structure in which a plurality of gratings are arranged at a predetermined interval. Therefore, the upper face of the metal reflection layer 20 is exposed between adjacent two of the inorganic transparent members 40.

Figure 2D:
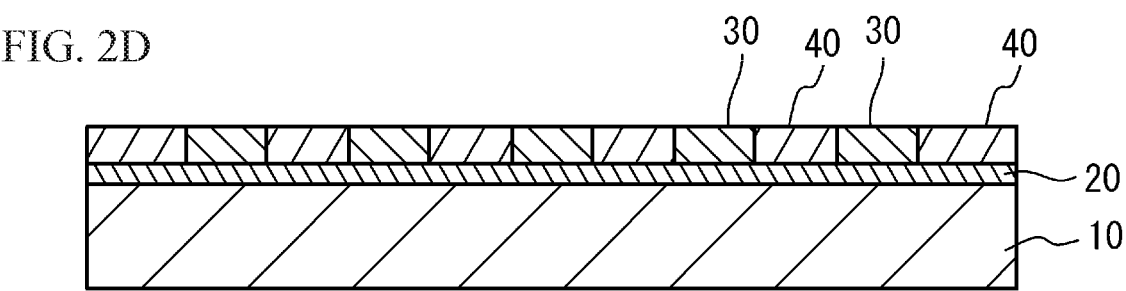

Next, as illustrated in FIG. 2D, it is possible to form the scale gratings 30 by selectively plating the exposed portion of the upper face of the metal reflection layer 20. Thus, the scale 100 is manufactured.

In the manufacturing method of the embodiment, phase gratings are formed by the level difference between the metal reflection layer 20 and the scale gratings 30. It is therefore possible to use the scale 100 as a reflection type scale.

Next, it is possible to reduce the level difference formed by the scale gratings 30 because the inorganic transparent member 40 is provided in a recess between the metal gratings of the scale gratings 30. It is therefore possible to suppress damaging of the scale gratings 30, during removing the contaminant adhering to the scale gratings 30 by wiping or the like. And it is possible to suppress remaining of the contaminant in the recess between metal gratings of the scale gratings 30, during removing the contaminant on the upper face of the scale gratings 30 by wiping. It is therefore possible to achieve high measurement accuracy.

Next, a process such as chemical mechanical polishing is not needed, because another layer such as a protective layer is not formed. It is therefore possible to simply manufacture the scale 100. In particular, when the scale gratings 30 are formed on the metal reflection layer 20 by plating or the like, a vacuum technology such as a vapor deposition device or a sputtering device may not be necessarily used. In this case, it is possible to more simply manufacture the scale 100. And, it is not necessary to keep a vacuum condition. It is therefore possible to easily perform an inspection of a layer thickness in the middle of the deposition process of the scale gratings 30.

It is preferable that the level difference between the upper face of the scale gratings 30 and the upper face of the inorganic transparent member 40 is equal or less than ¼ of the height (grating height) from the metal reflection layer 20 to each metal grating of the scale gratings 30. In this case, it is possible to suppress the damaging of the scale gratings 30 and remaining of the contaminant during wiping, because the level difference is small. Thus, it is possible to achieve high measurement accuracy. In particular, it is preferable that there is no level difference between the upper face of the scale gratings 30 and the upper face of the inorganic transparent member 40.

There is a case where the upper face of the scale gratings 30 is etched in order to adjust the level difference between the scale gratings 30 and the inorganic transparent members 40 after forming of the scale gratings 30. In the case, a side face of each metal grating of the scale gratings 30 is protected by the inorganic transparent member 40. Therefore, etching of the side face of each metal grating is suppressed. It is therefore possible to put the scale 100 into etching liquid even if a particular process is not performed.

The height from the metal reflection layer 20 to each metal grating of the scale gratings 30 is determined on the basis of parameters such as a wavelength of an incident light to the scale 100, an incident angle of the incident light, a diffraction index of the inorganic transparent member 40.

It is possible to form the scale gratings 30 by another method other than the plating. For example, liquid including a metal (metal nano ink) in which metal micro grains having a nano order grain diameter are dispersed may be used as filling liquid. It is also possible to form the scale gratings 30 by sintering the metal micro grains through optical sintering or thermal sintering of the metal nano ink.

Figure 3:
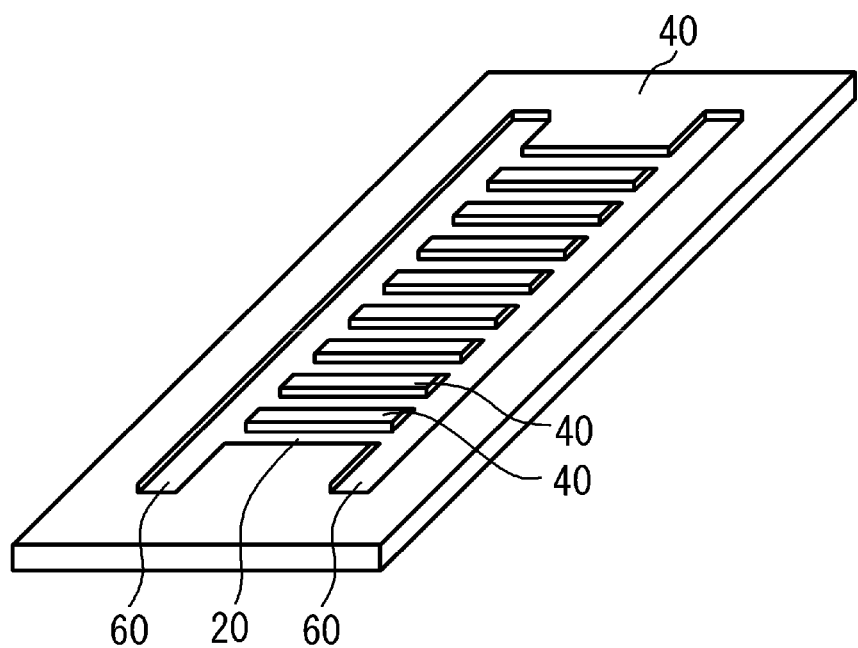
FIG. 3 illustrates an example in which metal nano ink is used.

For example, as illustrated in FIG. 3, the patterns of the inorganic transparent members 40 are formed so that a part of the metal reflection layer 20 corresponding to each metal grating of the scale gratings 30 is exposed and a groove 60 for connecting each edge of each portion corresponding to each metal grating is formed. The groove 60 may be formed at both edges of portions corresponding to metal gratings or may be formed at only one of the edges. In the embodiment, as an example, the groove 60 (first groove) connecting each edge of one side of the portions corresponding to the metal gratings of the scale gratings 30 and the groove 60 (second groove) connecting each edge of the other side of the portions corresponding to the metal gratings are formed.

As the filling liquid, an adequate amount of the metal nano ink is dropped into one of the groves 60. In this case, the exposed portions of the metal reflection layer 20 are filled with the metal nano ink by capillarity phenomenon. Excessive metal nano ink is exhausted into the other groove 60. Thus, the metal nano ink does not overflow from the portions corresponding to the metal gratings of the scale gratings 30 and is approximately evenly filled into the portions.

Figure 4:
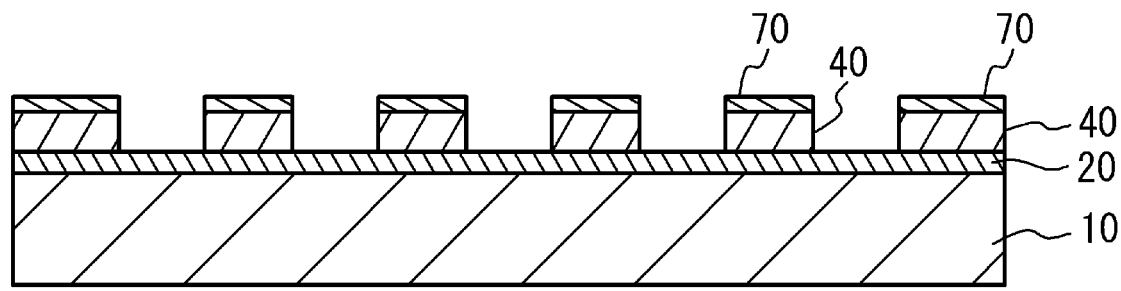
FIG. 4 illustrates a water-repellent process.

As illustrated in FIG. 4, a water-repellent layer 70 may be formed on the upper face of the inorganic transparent member 40 by performing a surface process such as a water-repellent process to the upper face of the inorganic transparent member 40 before supplying the filling liquid from the groove 60. The water-repellent layer 70 is a layer of which water-repellency is higher than that of the inorganic transparent member 40. With the structure, overflow of the metal nano ink to the upper face of the inorganic transparent member 40 is suppressed. Thus the yield in the processes is improved. The water-repellent process is not limited. The water-repellent process has only to be a process for enhancing the water-repellency. For example, it is preferable that a water-repellent process is performed so that a contact angle with respect to the filling liquid is equal to or more than 90 degrees.

Figure 5A:
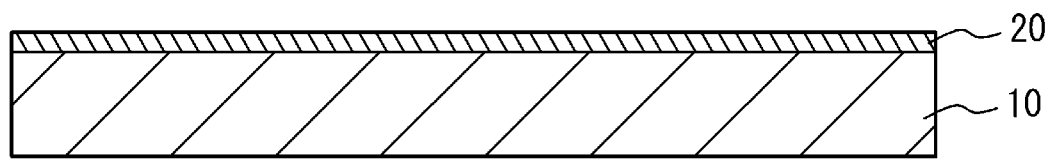
FIG. 5A to FIG. 5D illustrate another manufacturing method of a scale.

FIG. 5A to FIG. 5D and FIG. 6 illustrate another manufacturing method of the scale 100. As illustrated in FIG. 5A, the metal reflection layer 20 is formed on a face (upper face) of the substrate 10. It is possible to form the metal reflection layer 20 by a chemical vapor deposition method, a physical vapor deposition method or the like.

Figure 5B:
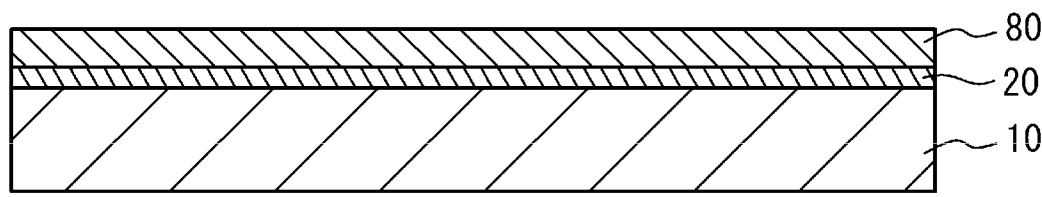

Next, as illustrated in FIG. 5B, a layer 80 to be etched is formed on the metal reflection layer 20. The layer 80 to be etched is a layer for forming the scale gratings 30. Therefore, a material of the layer 80 to be etched is the same as that of the scale gratings 30. It is possible to form the layer 80 to be etched by a chemical vapor deposition method, a physical vapor deposition method or the like.

Figure 5C:
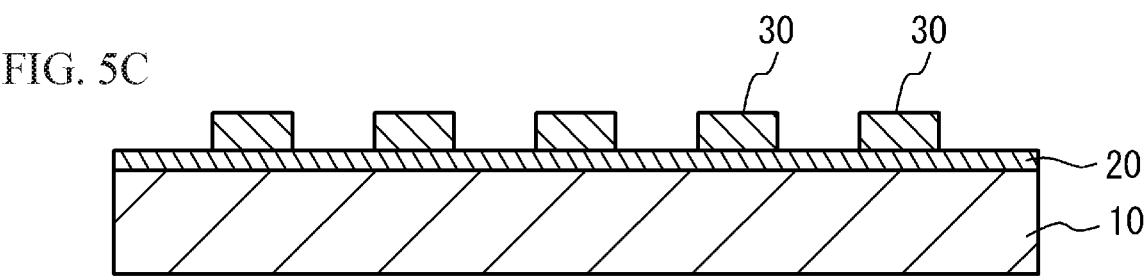

Next, as illustrated in FIG. 5C, resist patterns having the same patterns as the scale gratings 30 are used as masks, and the layer 80 to be etched is etched. Thus, the scale gratings 30 in which a plurality of metal gratings are arranged at a predetermined interval are formed. The upper face of the metal reflection layer 20 is exposed between adjacent two of the metal gratings.

Figure 5D:
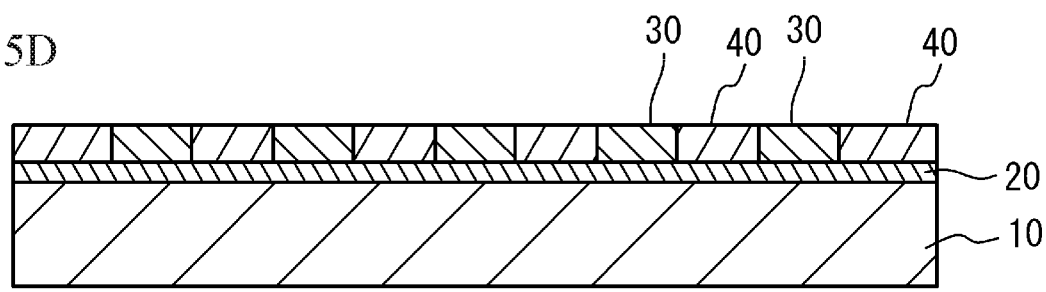
Figure 6:
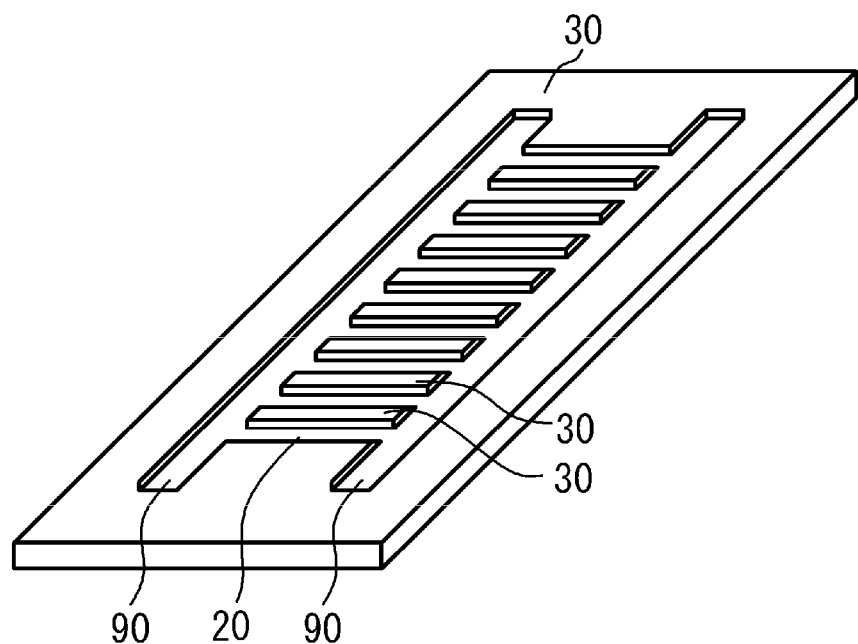
FIG. 6 illustrates another manufacturing method of a scale.

Next, as illustrated in FIG. 5D, as filling liquid, liquid inorganic transparent material is supplied into the exposed portion of the upper face of the metal reflection layer 20. For example, as illustrated in FIG. 6, the metal patterns are formed so that a part of the metal reflection layer 20 between each metal grating of the scale gratings 30 is exposed and a groove 90 for connecting each edge of each metal grating is formed. The groove 90 may be formed on both edges of metal gratings or may be formed on only one of the edges of the metal gratings. In the embodiment, as an example, the groove 90 (first groove) connecting each edge of one side of the metal gratings of the scale gratings 30 and the groove 90 (second groove) connecting each edge of the other side of the metal gratings are formed.

An adequate amount of the filling liquid including the inorganic transparent material is dropped into one of the groves 90. In this case, the exposed portions of the metal reflection layer 20 are filled with the filling liquid by capillarity phenomenon. Excessive filling liquid is exhausted into the other of the grooves 90. Thus, the filling liquid does not overflow from the metal gratings of the scale gratings 30 and is approximately evenly filled into the portion between the metal gratings. After that, the inorganic transparent member 40 is formed by sintering or the like. The inorganic transparent material may be polysiloxane, polysilazane or the like.

Figure 7:
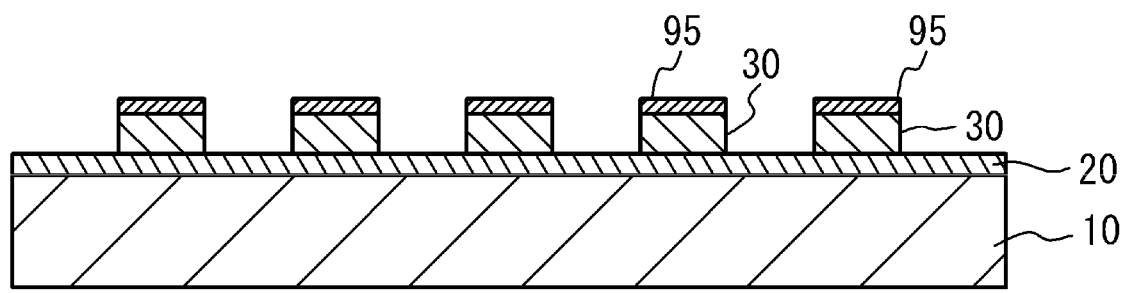
FIG. 7 illustrates a water-repellent process.

As illustrated in FIG. 7, a water-repellent layer 95 may be formed on the upper face of the scale gratings 30 by performing a surface process such as a water-repellent process to the upper face of the scale gratings 30 before supplying the filling liquid from the groove 60. The water-repellent layer 95 is a layer of which water-repellency is higher than that of the scale gratings 30. With the structure, overflow of the filling liquid to the upper face of the scale gratings 30 is suppressed. Thus, the yield in the processes is improved. The water-repellent process is not limited. The water-repellent process has only to be a process for enhancing the water-repellency. For example, it is preferable that a water-repellent process is performed so that a contact angle with respect to the filling liquid is equal to or more than 90 degrees.

Second Embodiment

Figure 8A:
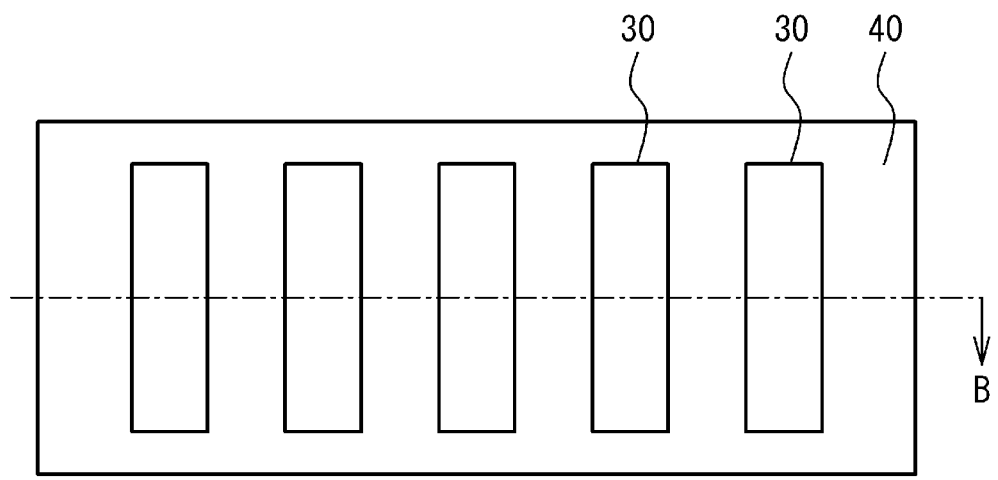
FIG. 8A illustrates a plan view of a scale in accordance with a second embodiment.
Figure 8B:
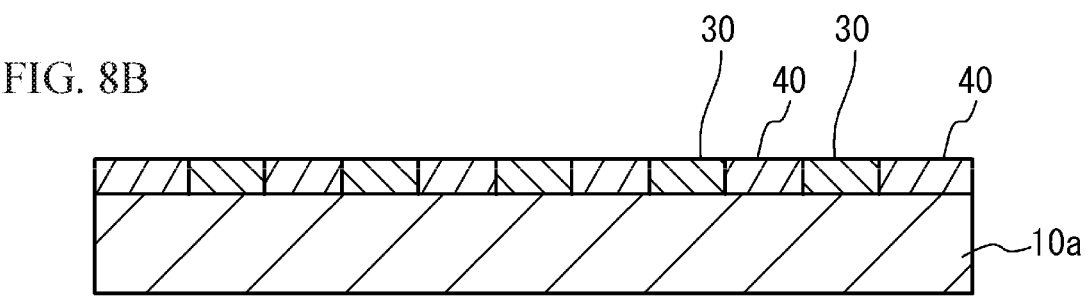
FIG. 8B illustrates a cross sectional view taken along a line B-B.

FIG. 8A illustrates a plan view of a scale 100a in accordance with a second embodiment. FIG. 8B illustrates a cross sectional view taken along a line B-B of FIG. 8A. As illustrated in FIG. 8A and FIG. 8B, the scale 100a is different from the scale 100 in a point that a substrate 10a is provided instead of the substrate 10 and the metal reflection layer 20. The substrate 10a is a metal material such as stainless. The metal reflection layer 20 is not needed, because the substrate 10a is made of a metal. In the manufacturing of the scale 100a, it is possible to omit the forming process of the metal reflection layer 20. For example, in the manufacturing method of FIG. 2A to FIG. 2D, the process of FIG. 2A may be omitted. In the manufacturing method of FIG. 5A to FIG. 5D, the process of FIG. 5A may be omitted.

The present invention is not limited to the specifically disclosed embodiments and variations but may include other embodiments and variations without departing from the scope of the present invention.

What is claimed is:

1. A scale comprising:
   a substrate;
   scale gratings that are formed on a face of the substrate and has a plurality of metal gratings at a predetermined interval; and
   an inorganic transparent member that is provided between the plurality of metal gratings,
   wherein at least a surface of the face of the substrate is made of a metal,
   wherein the scale gratings are provided on the metal of the face of the substrate,
   wherein the inorganic transparent member is provided on the metal of the face of the substrate, and
   wherein an upper face of the scale gratings and an upper face of the inorganic transparent member are exposed to atmosphere.

2. The scale as claimed in claim 1, wherein a level difference between the scale gratings and the inorganic transparent member is equal to or less than ¼ of a grating height of the metal gratings.

3. The scale as claimed in claim 1, wherein the substrate has a structure in which a metal layer is provided on a face of a glass substrate.

4. The scale as claimed in claim 1, wherein the metal gratings are plated members.

5. A manufacturing method of a scale comprising:
   forming a plurality of gratings of an inorganic transparent material on a face of a substrate at a predetermined interval; and
   forming a metal grating between the plurality of gratings by supplying liquid including a metal acting as filling liquid into between the plurality of gratings,
   wherein at least a surface of the face of the substrate is made of a metal,
   wherein the plurality of gratings are formed on the metal of the substrate, and
   wherein an upper face of the plurality of gratings and an upper face of the metal gratings are exposed to atmosphere.

6. The method as claimed in claim 5, wherein the filling liquid is plating solution, and
   wherein the meta grating are formed by plating.

7. The method as claimed in claim 5, wherein the filling liquid is metal ink in which metal micro grains are dispersed, and
   wherein the metal gratings are formed by sintering the metal micro grains by firing.

8. The method as claimed in claim 7, wherein a groove connecting edges of the plurality of gratings is formed on the face of the substrate, and
   wherein the filling liquid is supplied to between the plurality of gratings from the groove.

9. The method as claimed in claim 5, wherein a water-repellent process is performed to an upper face of the plurality of gratings before supplying the filling liquid to between the plurality of gratings.

10. A manufacturing method of a scale comprising:
    preparing a substrate in which a surface of at least a face is covered by a metal and a plurality of metal gratings are formed on the metal of the face at a predetermined interval; and
    forming an inorganic transparent member between the plurality of gratings by supplying liquid inorganic transparent material acting as filling liquid into the plurality of metal gratings,
    wherein an upper face of the plurality of metal gratings and an upper face of the inorganic transparent member are exposed to atmosphere.

11. The method as claimed in claim 10, wherein a pattern of a groove connecting edges of the plurality of gratings is formed on the face of the substrate, and
    wherein the filling liquid is supplied to between the plurality of gratings from the groove.

12. The method as claimed in claim 11, wherein the pattern has a first groove connecting edges of the plurality of gratings on one side and a second groove connecting edges of the plurality of gratings on the other side, and
    wherein the filling liquid is supplied from one of the first groove and the second groove.

13. The method as claimed in claim 10, wherein a water-repellent process is performed to an upper face of the plurality of gratings before supplying the filling liquid to between the plurality of gratings.

* * * * *